(12) United States Patent
Dickson et al.

(10) Patent No.: US 9,305,018 B2
(45) Date of Patent: Apr. 5, 2016

(54) CONTEXTUAL AND SEMANTIC DIFFERENTIAL BACKUP

(75) Inventors: Mathew J. Dickson, Sammamish, WA (US); Samuel J. McKelvie, Seattle, WA (US); David A. Nichols, Redmond, WA (US); John D. Mehr, Kenmore, WA (US); Kristin E. Lauter, La Jolla, CA (US); Elissa E. S. Murphy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 762 days.

(21) Appl. No.: 12/639,430

(22) Filed: Dec. 16, 2009

(65) Prior Publication Data

US 2011/0145198 A1 Jun. 16, 2011

(51) Int. Cl.
G06F 7/00 (2006.01)
G06F 17/00 (2006.01)
G06F 17/30 (2006.01)

(52) U.S. Cl.
CPC .................................. *G06F 17/3023* (2013.01)

(58) Field of Classification Search
None
See application file for complete search history.

(56) References Cited

U.S. PATENT DOCUMENTS

| | | | |
|---|---|---|---|
| 5,713,024 A | 1/1998 | Halladay | |
| 6,189,016 B1 | 2/2001 | Cabrera et al. | |
| 6,449,624 B1 * | 9/2002 | Hammack et al. | 707/999.1 |
| 7,051,053 B2 | 5/2006 | Sinha | |
| 7,243,103 B2 | 7/2007 | Murphy et al. | |
| 2002/0120648 A1 * | 8/2002 | Ball et al. | 707/511 |
| 2004/0177343 A1 * | 9/2004 | McVoy et al. | 717/122 |
| 2005/0125080 A1 * | 6/2005 | de Groot et al. | 700/17 |
| 2006/0248128 A1 | 11/2006 | Acharya et al. | |
| 2007/0271303 A1 * | 11/2007 | Menendez et al. | 707/200 |
| 2008/0033859 A1 * | 2/2008 | Olsen | 705/36 R |
| 2008/0034013 A1 | 2/2008 | Cisler et al. | |
| 2008/0034018 A1 | 2/2008 | Cisler et al. | |
| 2014/0033088 A1 * | 1/2014 | Shaver, Robert | 707/739 |

OTHER PUBLICATIONS

"Archive storage system design for long-term storage of massive amounts of data", retrieved on Jan. 6, 2009 at <<http://www.research.ibm.com/journal/rd/524/bradshaw.html>>, IBM Journal of Research and Development, 14 pages.

Fisher, "Recycle Bin not enough, Microsoft adds 'Previous Versions' support on the file system level", retrieved on Jan. 6, 2009 at <<http://arstechnica.com/news.ars/post/20060730-7383.html>>, Jul. 30, 2006, CondeNet Inc., 2009, 4 pages.

* cited by examiner

*Primary Examiner* — Jau-Shya Meng

(74) *Attorney, Agent, or Firm* — Bryan Webster; Judy Yee; Micky Minhas

(57) ABSTRACT

A backup system that utilizes contextual and semantic concepts is described. The backup system provides for the ability to create a version changes log for listing and tracking all the changes in the different versions of the file. The version changes log creates a contextual description around the changes, deletions and additions. The semantic concept log is created from the version changes log to create a log of all of the semantic concepts associated with each change. A visualization builder then creates visualizations that can be used by the user to search for changes, deletions and additions whether in a text file or an image file.

20 Claims, 6 Drawing Sheets

CONTEXTUAL AND SEMANTIC DIFFERENTIAL BACKUP

BACKGROUND

Backup systems for computing systems store everything from photographs to financial information to legal documents and, as such, it is imperative that these critical files are retained in the event of hardware failure, a building fire or any other calamity that may occur.

In existing backup systems, files are retained by a storage mechanism connected either permanently or temporarily to a computing environment in order to retain the files on some type of storage media. The storage media is preferably not co-located with the computing system.

Existing backup systems typically retain multiple versions of a file reflecting changes throughout the history of the file in the form of block differences. A block difference indicates that a particular block of data has changed between versions. However, this type of high-level look at the changes between versions does not provide a great deal of assistance for the user.

SUMMARY

A contextual and semantic backup system is described. The backup system provides for the ability to monitor edits, changes, deletions and additions by creating a version changes log for listing and tracking all the changes in the different versions of the file. This version changes log thereby creates a history or journal of all the changes. In addition, the version changes log creates a contextual description around the changes. This version changes log may also allow for efficient compression of the files and may also allow for development of a semantic concept log that includes a log of all of the semantic concepts associated with each change. As such, the semantic concept log allows for more effective search of these changes.

The version changes log and the semantic concept log are used in a change visualization module to create user-friendly ways in which to search the changes. For instance, users may employ text searches and, in addition, visualization tools are also available to enhance the searching process. Furthermore, the system also allows for some inferences to be made with respect to the changes such that a determination may be inferred as to why a change was made. With the user friendly and detailed search available to the user to find individual changes, the subject backup system provides a unique way for a user to find changes that have been made, determine why they were made and incorporate or undo them individually in current files.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
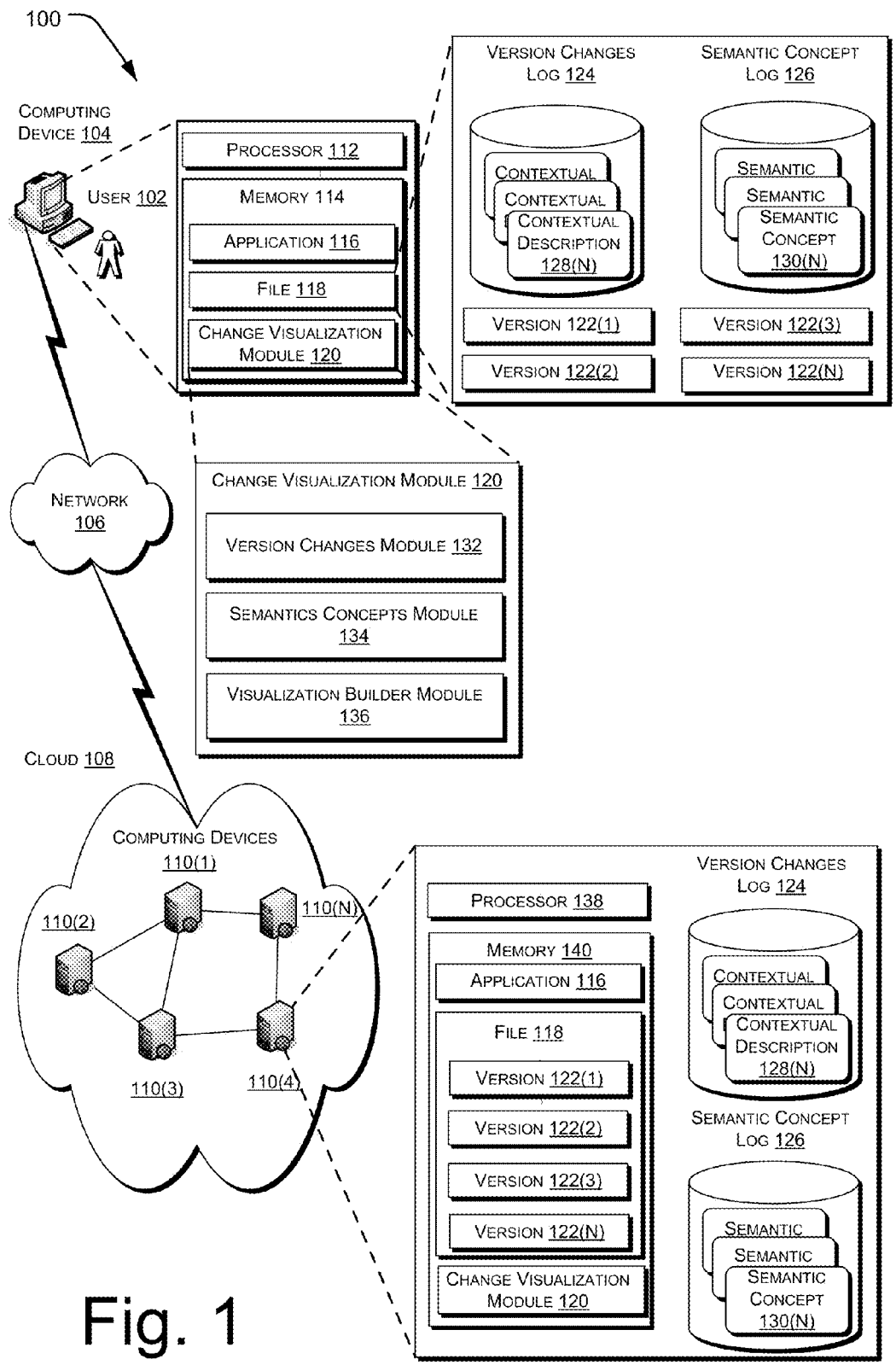
FIG. 1 depicts an illustrative architecture that implements a backup system using contextual and semantic differentiation.

This document describes a complete backup system for retaining files in a computing environment. The backup system is a system that utilizes contextual descriptions and semantic concepts. Additionally, the system provides for changes to be tracked to an individual file. These capabilities are used to provide a journal or history of changes that are easily searchable. These capabilities also provide a user-friendly user interface to assist a user in removing changes, incorporating changes and understanding the changes that have been made in order to make an informed decision as to whether or not to incorporate a particular change.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details.

The claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Of course, those skilled in the art will recognize many modifications may be made to this configuration without departing from the scope or spirit of the claimed subject matter.

Illustrative Architecture

FIG. 1 depicts an illustrative architecture that provides a backup system that uses contextual descriptions and semantic concepts. As illustrated, the architecture 100 includes a user 102 and a computing device 104. Computing device 104 may include personal computers, servers, portable devices and so on. The computing device 104 may be connected to a network 106 which may in turn be connected to a pool of servers or "cloud" 108. Cloud 108 includes a number of computing devices 110(1), 110(2), 110(3), 110(4) . . . 110(N) that may run applications using a processor and memory. In addition, computing devices 110(1)-(N) of cloud 108 may retain files in a similar fashion as local computing device 104, except cloud 108 may be located remotely from computing device 104 to serve as a secure backup to files that the local device stores.

Computing device 104 includes a processor 112 and memory 114. As illustrated, memory 114 stores an application 116, a file 118 and a change visualization module 120. Application 116 may be any type of application including a word processing application, an e-mail program, a photo program, a video program or any other user application. File 118, meanwhile, is the file that results from running the application 116. Through the course of time, as user 102 uses the application 116 and makes various changes to the file 118, different versions 122(1), 122(2), 122(3) . . . 122(N) of the file 118 are created.

Each version may have multiple changes, edits, deletions and the like associated with it. The version changes log 124 records each change, edit, addition and deletion and retains that information in a database as a contextual description 128(1), 128(2) . . . 128(N).

The version changes log 124 represents a backup system that tracks changes as well as new versions of a particular file. The contextual descriptions 128(1)-(N) and the semantic concepts 130(1)-(N) are additional information that may be applied to various visualizations more fully described in FIGS. 2-5 below. The version changes log 124 may be used for mechanically recovering an older or previous version of the file 118. Meanwhile, the contextual descriptions 128(1)-(N) and the semantic concepts 130(1)-(N) may be used to illustrate the edit history to a user in the form of visualizations more fully described in FIGS. 2-5 below.

The contextual descriptions 128(1)-(N) and the semantic concepts 130(1)-(N) may be appended to the version changes log 124 to assist users in remembering or discovering how the file changed from a particular state to a subsequent state. The appending of such information may use file type-specific knowledge that may be provided by the editing application itself or with special analyzers that would generate the additional information after the changes have been made.

The contextual descriptions 128(1)-(N) are textual summaries of the change. For instance, a change may be logged as "10 (CAR) (Oct. 12, 2009) Now is the winter of our discontent . . . " which shows the item number "10", the version "(CAR)", the date "Oct. 12, 2009" and the change description. Here, the term "summer" may appear in strikethough (indicating that it has been deleted) while the term "summer" may appear underlined (indicating that it has been added).

It is important to note that the change may be applicable to a word processing file, an image file, a video file, an e-mail file and so on. For instance, in an image file, assume the brightness had been changed between the first version of the file and the second version of the file. The contextual description 128 may read "Version Two (Oct. 12, 2009) The brightness was changed one setting brighter from version one." In this manner, since the change has been reduced to text, the change operates the same as on a word processing file for the purposes of searching and the like.

Likewise, an e-mail file may also be used. In this case there are typically not very many changes, however, context of e-mail chains may be versioned for the user 102 to search to show what the user 102 is working on in a particular instance. For example, several e-mail files may relate to an exchange with another person regarding a particular project. One may have trouble remembering both the subject matter of the project and the reasoning behind specific changes to the project. By versioning and using semantic concepts on the e-mail files, all e-mails pertaining to that particular project can be found and grouped together. This allows the user to find the changes and other information contained in the e-mails related to the project.

The version changes log 124 of individual contextual descriptions 128(1), 128(2) and 128(N) provides for a detailed history of each change and also provides for a more efficient and resource effective system for compressing the version changes log 124. Since the change without all of the associated text in the remainder of the file 118 may be retained, the size of the stored log is much smaller.

In addition, the contextual descriptions may be used to create a semantic concept log 126 in which a semantic concept 130(1), 130(2) . . . 130(N) is stored for each contextual description 128(1)-(N). A semantic concept 130(1)-(N) may comprise a searchable representation of a respective contextual description 128(1)-(N) of the version changes log 124. It may include verbiage such as "s/summer/winter/g" to represent the example shown in the paragraph above. This representation is an example of a semantic concept description of replacing "summer" with "winter" in the example above. It may also include a thumbnail or image representation that contains some searchable component. A semantic concept 130(1)-(N) is developed to be easily searchable by a text search, a visual search and/or the like.

A contextual description of a change typically includes a textual description of the change to the file. For example, for a text file, a contextual description may state "the word 'summer' is replaced with the word 'winter'." For an image file, a contextual description may state, as above, "Version Two (Oct. 12, 2009): The brightness was changed one setting brighter from version one." Meanwhile, a semantic description is a description of the change better understood by the computing device and thus more easily searched. For example, replacing the word "summer" with "winter" may be represented by the semantic description "s/summer/winter/g."

The semantic concept log 126 may then be used in the change visualization module 120 to develop a user interface to assist the user in efficiently accessing the information in the version change log 124 and the semantic concept log 126. The change visualization module 120 includes a version changes module 132, a semantics concepts module 134 and a visualization builder module 136.

The version changes module 132 creates the version changes log 124 from the changes in the versions 122(1)-(N) of the file 118. The semantics concepts module 134 creates the semantic concept log 126 from the version changes log 124. Finally, the visualization builder module 136 creates various representations from the semantic concept log 126 to assist the user 102 in accessing and effectively using the semantic concept log 126. Three different representations are shown in FIGS. 2-5 discussed below.

Cloud 108 may also perform the entire sequence described above or a part of it or none at all depending on the user 102. It is important to note that since the semantic concept log 126 may be easily searched, it is also possible to make inferences about the changes over time. Comparisons of the changes may be made over time to help indicate why the change was made and why subsequent changes were made. In cloud computing environment 108, the use of inferences may be more useful since there will be a greater population of logs and databases from which to draw the inference information. On computing device 104, inferences would only be drawn from the files located on the local storage media. However, if the backup operation was conducted over the network 106 using cloud 108, multiple computing devices 110(1)-(N) could be used to draw from and enhance the effectiveness of the inferences.

Cloud 108 includes computing devices 110(1)-(N) as earlier stated and each computing device 110(1)-(N) may include processor 138 and memory 140. In addition or in the alternative to running on memory 114 of computing device 104, application 116 may also run on memory 140 and may create and/or store file 118. Again, file 118 may include several versions 122(1)-(N). The change visualization module 120 creates the version changes log 124 by logging a list of the changes that have occurred over the history of the file 118 in the form of contextual descriptions 128(1)-(N). The change visualization module 120 then creates the semantic concept log 126 from the version changes log 124 in the form of semantic concepts 130(1)-(N). The change visualization module 120 then creates a visualization from the semantic concept log 126 that can be used by the user 102 to search and analyze the changes. A user 102 may conduct all, some or none of these operations on the cloud 108, as the particular situation and user 102 desires dictate.

Figure 2:
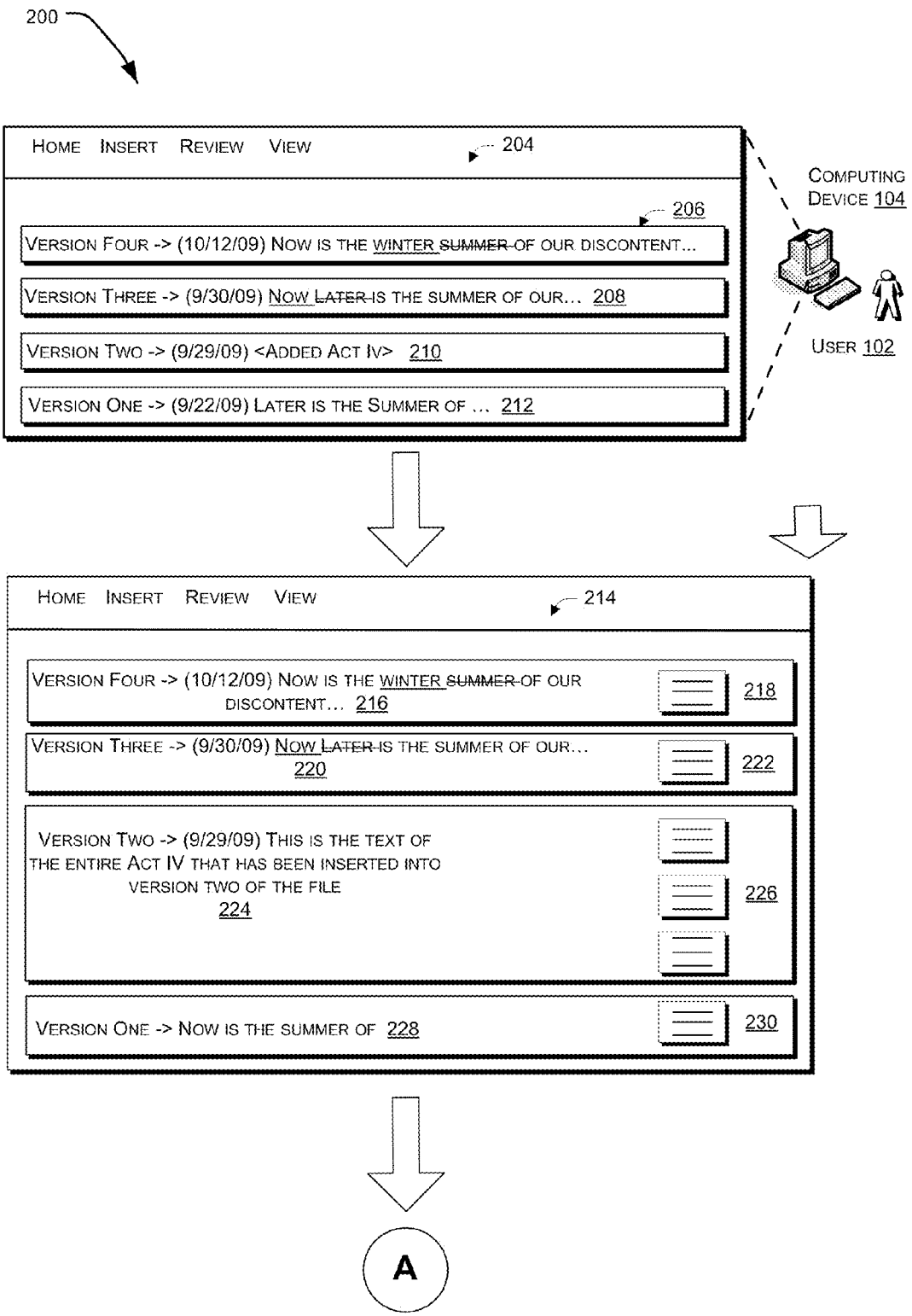
FIGS. 2 and 3 depict an illustrative flow diagram that change visualization module may implement within the architecture of FIG. 1.
Figure 3:
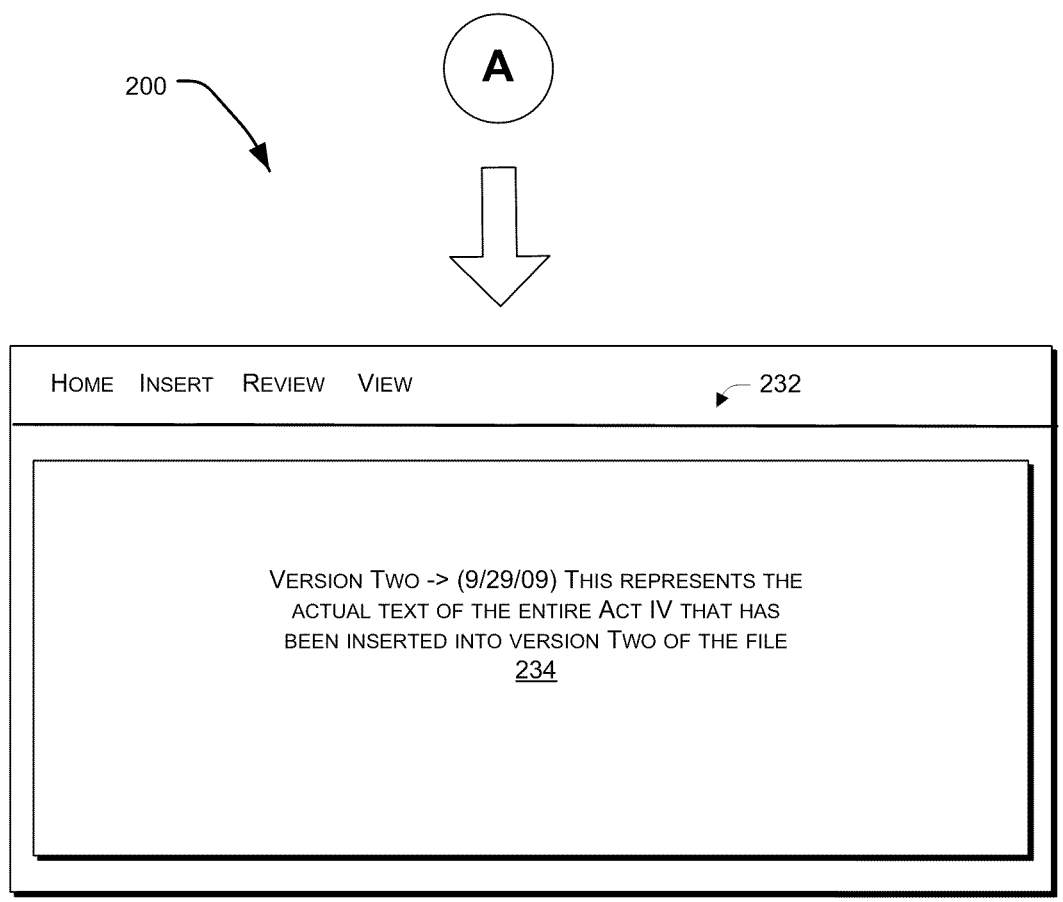

FIGS. 2 and 3 represent flow diagrams of a visualization resulting from the implementation of the architecture of FIG. 1. From a conceptual standpoint, FIGS. 2 and 3 begin with several versions of a file that includes changes made at different times. The changes are of different significance, that is, some are minor with very few changes and others are major with many changes. A user needs a method in which to easily search and scan the changes for those that are relevant to what he or she is looking for. Consequently, the representations of the various versions of the file are expanded to include both the contextual description as well as a visual representation. At this point the user may quickly scan over the list of version and quickly identify both the changes and whether there were major or minor changes. For major changes, the visual representation will show an expanded visual representation that can be quickly identified. Once the user clicks on the version he or she is looking for, the details of that particular version may be displayed.

Now turning to the specific flow diagram in FIGS. 2 and 3, Representation 200 includes a user 102 and computing device 104. User interface 204 depicts four different version changes. Version four change 206 depicts the version "Version Four," the date "Oct. 12, 2009" and the change "Now is the winter of our discontent . . . ." This change is logged in the version changes log in the previous discussion. The changes for version three 208, version two 210 and version one 212 are all shown on the same screen. It is noted that version two 210 shows a general change comment since the entire text of Act IV would be impractical to view on one display screen.

These changes are shown in user interface 214 in their semantic format. Version four 216 is shown with its textual change as well as an image 218 that portrays the extent of the change. Since version four 216 is a relatively minor change, the image 218 does not need to portray a significant amount of information. The image 218 can portray the information in any standard format for representing a change, but is typically represented as a redlined change as is typical in a Microsoft® Word® document.

Version three 220 is also shown with image 222. Again version two is a relatively minor change and is represented as such. Version three 224 is shown with image 226. In this case, version two 224 is a major change and image 226 may include multiple images. Finally version one 228 is again a relatively minor change and is pictorially represented by image 230.

FIG. 3 continues the illustration of flow diagram 200 from FIG. 2 and shows the results of a search by the user 102. The user 102 has simply clicked on version two 224. Since the images are visually reflective of the changes that have occurred, the user 102 may scroll down the images and select an image in that manner. User interface 232 shows the full text of Act IV that has been inserted in version two 234.

Figure 4:
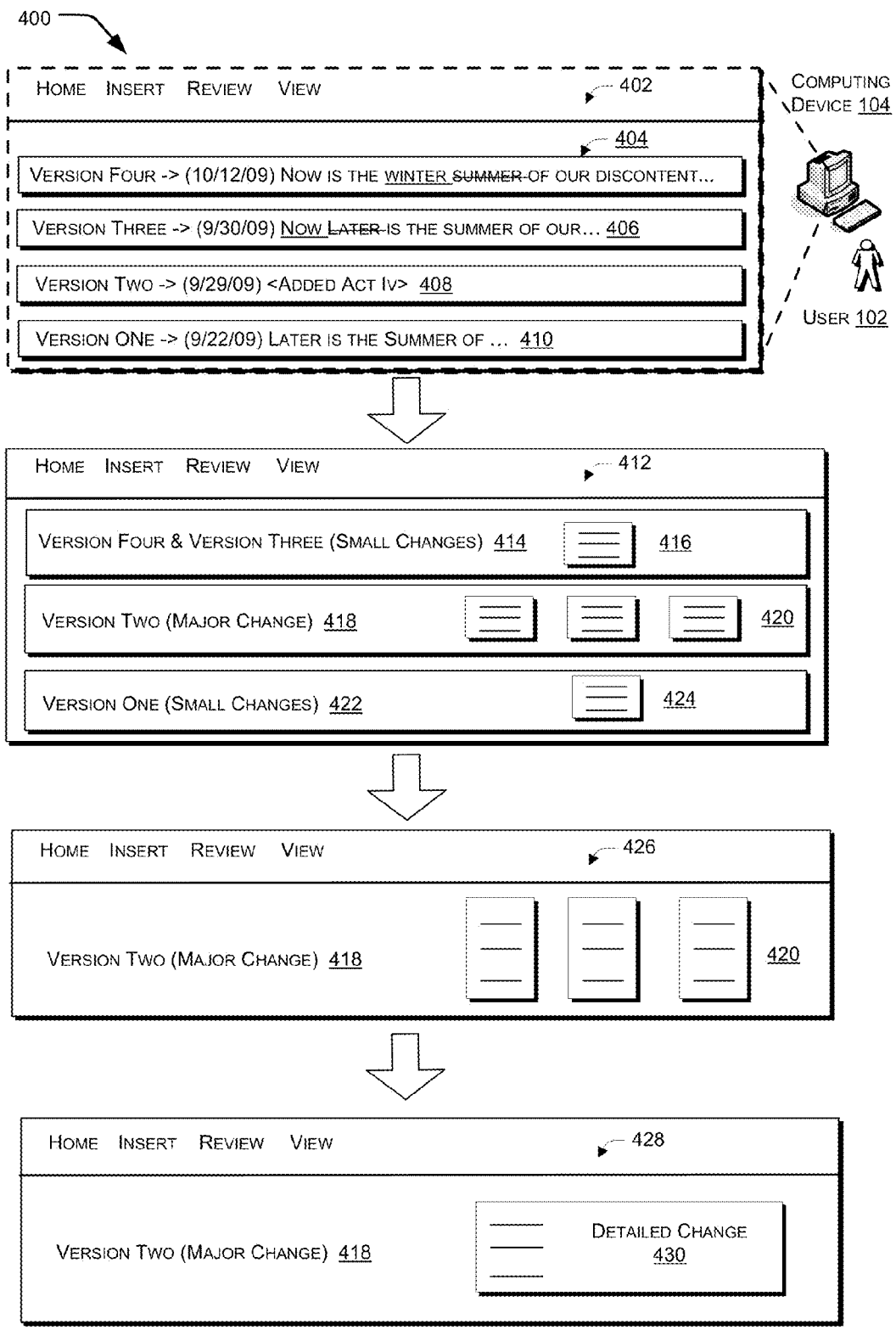
FIG. 4 depicts another flow diagram that the change visualization module may implement within the architecture of FIG. 1.

FIG. 4 represents another flow diagram of a visualization resulting from the implementation of the architecture of FIG. 1. The visualization in FIG. 4 again begins with a list of the various versions of the file and the contextual description of the changes to those versions. Again, in order to assist the user in quickly identifying the particular file or files for which he or she is looking, a visual representation for each of the versions is shown. In this case, the version changes are simply identified at a high level as a small change or a major change along with a visual representation that pictorially identifies whether the changes are small or major by the layout of the visual representation.

However, the next representation shows more detail of the changes of the version selected. For instance, the visual representations may show the changes within the context of the file instead of a contextual description of the change itself. Finally, the detailed and complete changes of the version selected are shown Turning to the specifics of FIG. 4, representation 400 includes a user 102 and computing device 104. User interface 402 again depicts four different version changes. Version four change 404 depicts the version "Version Four," the date "Oct. 12, 2009" and the change "Now is the winter of our discontent . . . ." This change is logged in the version changes log in the previous discussion in FIG. 1. The changes for version three 406, version two 408 and version one 410 are all shown on the same screen.

User interface 412, meanwhile, has categorized the changes according to predetermined parameters defining what constitutes a small change and what constitutes a major change. It is understood that predetermined parameters may be set up for any type of search criteria. In this case, the user has decided to search for small changes and major changes to narrow down what the user 102 is looking for. Consequently, version four and version three 414 are now grouped together because they were next to each other and both represented small changes. Image 416 visually represents the changes.

Version two 418 and images 420 are listed separately since they represent a major change. Version one 422 and image 424 again represent a small change.

This manner of visualizing is the result of an initial search by user 102 where the version was categorized by small and major changes. In this manner, the user 102 could easily select the major change the user 102 was looking for and select it. Consequently, user interface 426 depicts the result of the selection by the user 102. Version two 418 and image 420 are represented on a screen by themselves. A subsequent selection by user 102 results in user interface 428 showing version two 418 in detail. Detailed change 430 may include the full text of Act IV or a selected portion highlighted by the user 102.

Figure 5:
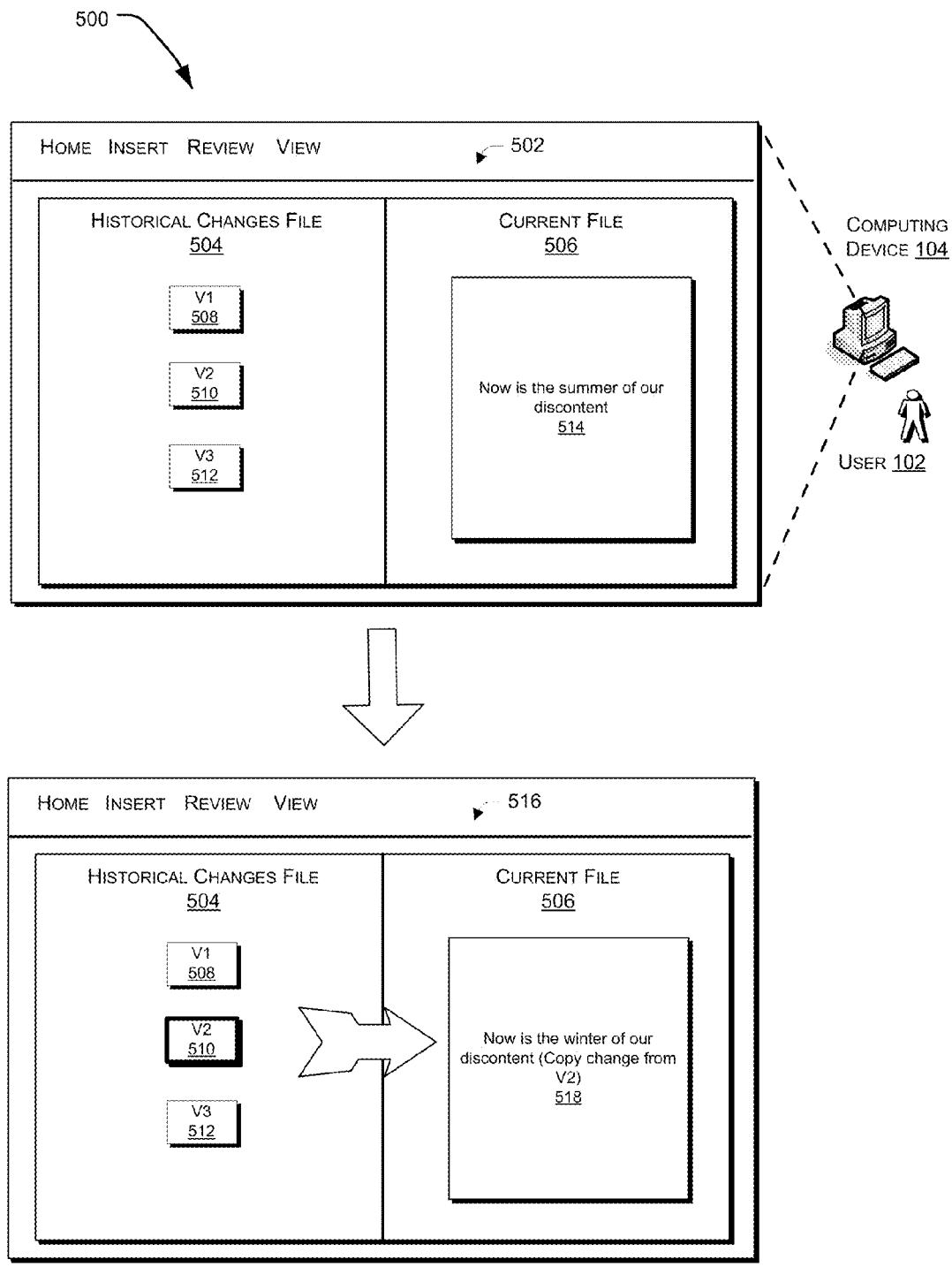
FIG. 5 depicts yet another flow diagram that the change visualization module may implement within the architecture of FIG. 1.

FIG. 5 represents another flow diagram of a visualization resulting from the implementation of the architecture of FIG. 1. Again, this is another example of a representation that enables the user to quickly and easily select the file for which he or she is looking. In this representation, a display is split to show historical changes on one side of the display and the file in which the user is currently working on the other side of the display. The historical changes file may show some or all of the changes in a particular version for quick scanning by the user. Once one of the historical changes files is identified by the user, the user may select the file and either make the same change in the current file or undo a change made in a previous historical file.

Again turning to the specifics of FIG. 5, representation 500 again includes a user 102 and a computing device 104. User interface 502 represents a split screen with a historical changes file 504 on one side and on the other side a current file 506 representing the file the user 102 is currently working on. The historical changes file 504 include V1 508, V2 510 and V3 512 all representing past versions of the file. The current file 506 is represented by the text of the current file 514 which in the example states "Now is the summer of our discontent."

User interface 516 again illustrates the historical changes file 504 and the current file 506. However, in user interface 516, the user 102 desires to copy a change from one of the previous versions into the current text 518. In this case, the user 102 may select V2 510 since that version contains the change the user 102 is searching for. Once V2 510 is selected, V2 510 will go to the same location in the file as where the current file 506 is currently positioned. At this point, the user 102 simply copies the individual change from V2 510 to the current text 518 and the change is now inserted in the current file 506. This method may also be used to undo changes. Changes can be inserted or undone either globally or on an individual change basis.

Illustrative Flow Diagram

Figure 6:
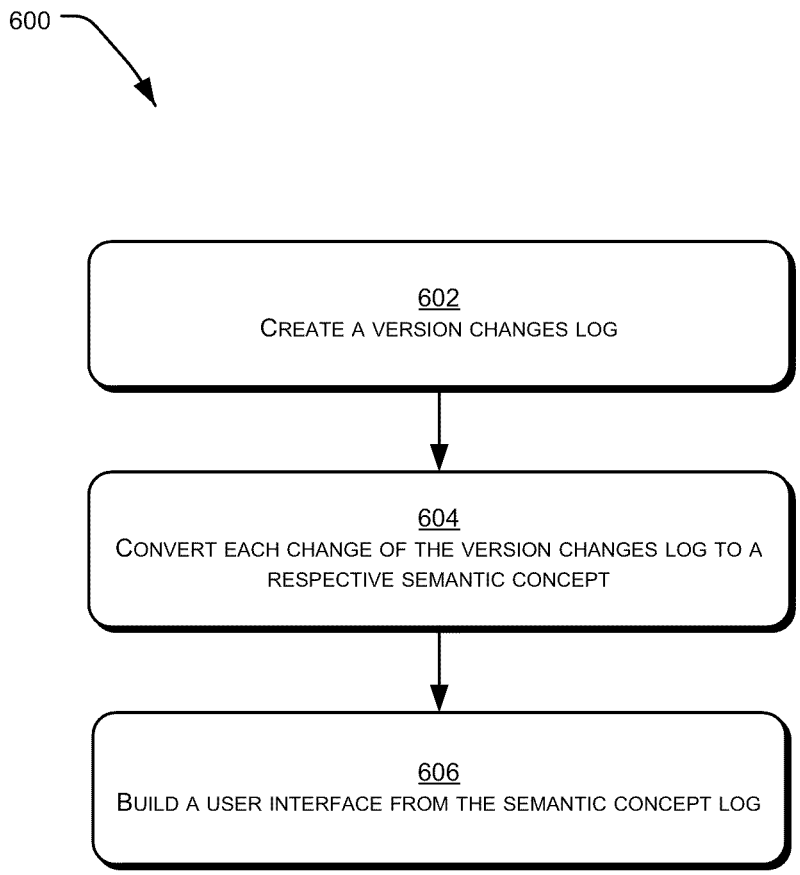
FIG. 6 is a flow diagram of an illustrative process for performing the backup system illustrated in the architecture of FIG. 1.

FIG. 6 depicts an illustrative process 600 for implementing the backup system that may be implemented by the architecture of FIG. 1 and/or by other architectures. This process 600 is illustrated as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types.

Process 600 includes operation 602 in which a version changes log is created from the changes in the various versions of a file. For instance, operation 602 may create version changes log 124 from versions 122(1)-(N) discussed above. In operation 504, each change of the version changes log is converted to a respective semantic concept in the semantic concept log. For instance, operation 504 may convert these changes into semantic concepts 130(1)-(N), discussed above with reference to FIG. 1. Finally, operation 506 then builds a user interface from the semantic concept log to allow a user to search through the changes and analyze and, if desired, implement them.

CONCLUSION

The description herein describes a backup system that utilizes contextual and semantic concepts. The backup system provides for the ability to create a version changes log for listing and tracking all the changes in the different versions of the file. The version changes log creates a contextual description around the edits and changes. The semantic concept log is created from the version changes log to create a log of all of the semantic concepts associated with each change. A visualization builder then creates visualizations that can be used by the user to search for changes, deletions and additions whether in a text file or an image file.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
creating, at one or more processing devices, a version changes log comprising information about one or more changes made by a user in each of multiple versions of a particular file, the information regarding at least one of the one or more changes including a complete copy of a corresponding version;
converting each of the one or more changes of the version changes log to a respective semantic concept for storage in a semantics concept log, each respective semantic concept comprising a contextual description of the respective change within the version changes log; and
building a user interface from the semantic concepts log, the user interface including a visual representation of: (i) at least a portion of each of the multiple versions of the particular file, (ii) the contextual description for each respective change within each version of the multiple versions of the particular file, (iii) a prompt to select an individual change from a historical changes file, wherein a response corresponding to the prompt causes the selected individual change to be applied to, or removed from, a current version of the particular file, and (iv) a significance of changes indication for each of the multiple versions of the particular file based at least on an amount of changes previously made to a particular version of the multiple versions of the particular file, wherein the significance of changes indication is in a first visual representation when identifying minor changes and a second visual representation when identifying major changes, the second visual representation includes more images than the first visual representation, the second visual representation is an expanded visual representation as compared to the first visual representation.

2. The method of claim 1, wherein the user interface further includes a visual representation of a version list that comprises each of the multiple versions of the particular file and, adjacent to the respective version of the particular file in the version list, a visual representation of the contextual description for each of at least a portion of the one or more changes that appear within the respective version of the particular file.

3. The method of claim 1, wherein the contextual description for each respective change within each version of the multiple versions of the particular file is at least one of a textual description or a pictorial depiction of each respective change.

4. The method of claim 3, wherein the pictorial depiction is a picture illustrating the change for each respective change within each version of the multiple versions of the particular file.

5. The method of claim 3, wherein the pictorial depiction comprises a first picture depicting the current version of the particular file incorporating recent changes and a second picture depicting a previous version of the particular file before incorporating the recent changes.

6. The method of claim 1, wherein the user interface further includes a visual representation of a side-by-side comparison of the current version of the particular file with an historical changes file comprising previous versions of the particular file such that a particular location within the current version of the particular file is synchronized with a same location in the previous versions of the particular file within the historical changes file.

7. The method of claim 1, wherein the building of the user interface from the semantics concepts log, for each respective change, includes: (i) presenting details of each respective change in the contextual description; and (ii) making inferences during the building of the user interface about why each respective change occurred.

8. The method of claim 1, wherein the building of the user interface includes categorizing changes associated with each version in the amount of changes based at least on the significance of changes indications.

9. A system comprising:
one or more processors; and
one or more computer-executable media comprising computer-executable instructions executing on the one or more processors;
a version changes module creates a version changes log comprising information about one or more changes made by a user in each of multiple versions of a particular file of an application, the information regarding at least one of the one or more changes including a complete copy of a corresponding version;
a semantics concepts module converts each of the changes of the version changes log to a respective semantic concept for storage in a semantics concept log, each respective semantic concept comprising a contextual description of the respective change within the version changes log; and
a visualization building module builds a user interface from the semantic concepts log, the user interface including a visual representation of: (i) at least a portion of each of the multiple versions of the particular file, (ii) the contextual description for each respective change within each version of the multiple versions of the particular file; (iii) a prompt to select an individual change from a historical changes file, wherein a response corresponding to the prompt causes the selected individual change to be applied to, or removed from, a current version of the particular file, and (iv) a significance of changes indicator for each of the multiple versions of the particular file based at least on an amount of changes previously made to a particular version of the multiple versions of the particular file, wherein the significance of changes indicator is in a first visual representation when identifying minor changes and a second visual representation when identifying major changes, the second visual representation includes more images than the first visual representation, the second visual representation is an expanded visual representation as compared to the first visual representation.

10. The system of claim 9, wherein the visualization building module for building the user interface further includes a visual representation of a version list that comprises each of the multiple versions of the particular file and, adjacent to the respective version of the particular file in the version list, a visual representation of the contextual description for each of at least a portion of the one or more changes that appear within the respective version of the particular file.

11. The system claim 9, wherein the contextual description for each respective change within each version of the multiple versions of the particular file comprises a textual description or a pictorial depiction of each respective change.

12. The system of claim 11, wherein the pictorial depiction comprises a picture illustrating the change for each respective change within each version of the multiple versions of the particular file.

13. The system of claim 9, wherein the building of the user interface from the semantics concepts log, for each respective change, includes: (i) presenting details of each respective change in the contextual description; and (ii) making inferences during the building of the user interface about why each respective change occurred.

14. The system of claim 9, wherein the historical changes file comprises previous versions of the particular file such that a particular location within the current version of the particular file is synchronized with a same location in the previous versions of the particular file within the historical changes file.

15. The system of claim 9, wherein the visualization building module categorizes changes associated with each version in the amount of changes based at least on the significance of changes indications.

16. A method comprising:
creating, at one or more processors, a version changes log comprising information about one or more changes made by a user in each of multiple versions of a particular file, the information regarding at least one of the one or more changes including a complete copy of a corresponding version;
converting each of the changes of the version changes log to a respective semantic concept for storage in a semantics concept log, each respective semantic concept comprising a contextual description of the respective change within the version changes log; and
building a user interface from the semantic concepts log, the user interface including a visual representation of: (i) at least a portion of each of the multiple versions of the particular file, (ii) the contextual description for each respective change within each version of the multiple versions of the particular file, (iii) a changes significance indication for at least one version of the multiple versions of the particular file based at least on an amount of changes previously made to the at least one version of the multiple versions of the particular file, wherein the significance of changes indication is in a first visual representation when identifying minor changes and a second visual representation when identifying major changes, the second visual representation includes more images than the first visual representation, the second visual representation is an expanded visual representation as compared to the first visual representation (iv) a visual representation of a side by side comparison of a current version of the particular file with an historical changes file comprising previous versions of the particular file such that a particular location within the current version of the particular file is synchronized with a same location in the previous versions of the particular file within the historical changes file; and (v) a prompt to select an individual change from the historical changes file, wherein a response corresponding to the prompt causes at least one of the selected individual change to be applied to a current version of the particular file or to undo an individual change from the historical changes file in the current version of the particular file.

17. The method of claim 16, wherein the visual representation further includes a version list that comprises each of the multiple versions of the particular file and, adjacent to the respective version of the particular file in the version list, a visual representation of the contextual description for each of at least a portion of the changes that appear within the respective version of the particular file.

18. The method of claim 16, wherein the contextual description for each respective change within each version of the multiple versions of the particular file is a textual description or a pictorial depiction of each respective change.

19. The method of claim 18, wherein the pictorial depiction is a picture illustrating the change for each respective change within each version of the multiple versions of the particular file.

20. The method of claim 16, further comprises categorizing changes associated with each version based at least on the amount of changes.

\* \* \* \* \*